(12) United States Patent
Orton

(10) Patent No.: US 12,516,478 B2
(45) Date of Patent: Jan. 6, 2026

(54) EDGE RESTRAINT SYSTEM FOR PAVERS

(71) Applicant: David S. Orton, Princeton, MN (US)

(72) Inventor: David S. Orton, Princeton, MN (US)

( * ) Notice: Subject to any disclaimer, the term of this patent is extended or adjusted under 35 U.S.C. 154(b) by 636 days.

(21) Appl. No.: 18/048,162

(22) Filed: Oct. 20, 2022

(65) Prior Publication Data

US 2024/0026614 A1     Jan. 25, 2024

Related U.S. Application Data

(60) Provisional application No. 63/368,944, filed on Jul. 20, 2022.

(51) Int. Cl.
    *E01C 11/22*     (2006.01)

(52) U.S. Cl.
    CPC ................... *E01C 11/223* (2013.01)

(58) Field of Classification Search
    CPC ............... E01C 11/222; E01C 11/223
    See application file for complete search history.

(56) References Cited

U.S. PATENT DOCUMENTS

| | | | |
|---|---|---|---|
| D329,709 S | 9/1992 | Strobl | |
| 5,240,343 A * | 8/1993 | Strobl, Jr. | ............. E01C 11/221 404/8 |
| 5,375,941 A | 12/1994 | Strobl | |
| 5,421,118 A * | 6/1995 | Bauer | ...................... A01G 9/28 47/33 |
| 6,071,038 A * | 6/2000 | Strobl, Jr. | ............. E01C 11/221 47/33 |
| 6,485,226 B1 * | 11/2002 | Harger | .................. E01C 11/223 404/11 |
| 6,767,159 B2 | 7/2004 | Jones | |
| D615,673 S * | 5/2010 | Flynn | ........................... D25/164 |
| 7,774,992 B2 | 8/2010 | Garofalo et al. | |
| 7,774,993 B2 | 8/2010 | Strobl et al. | |
| 7,963,718 B2 * | 6/2011 | Zwier | .................... E01C 11/221 47/33 |
| 8,266,844 B2 | 9/2012 | Kurtz et al. | |
| 9,345,199 B2 | 5/2016 | Flynn | |
| 10,060,081 B2 * | 8/2018 | Alfieri, III | ............... A01G 9/28 |
| D827,872 S | 9/2018 | Amrine et al. | |
| 10,729,077 B2 * | 8/2020 | Bahler | ...................... A01G 9/28 |
| 11,712,007 B2 * | 8/2023 | Merani | .................... A01G 9/28 52/102 |

(Continued)

*Primary Examiner* — Gary S Hartmann
(74) *Attorney, Agent, or Firm* — Gurr & Brande, PLLC; Robert A. Gurr

(57) ABSTRACT

An edge restraint system for pavers includes two or more interlocking edge restraints, a spike, and optionally, a grid clip. The interlocking edge restraints each have a vertical member and a horizontal member buttressed by a gusset. The horizontal member has a first engagement area having a first alignment button, a second alignment button, and a first spike aperture. The horizontal member has a second engagement area having a first alignment button aperture, a second alignment button aperture and a second spike aperture. The first and second interlocking edge restraints may be coupled together at the first and second engagement areas, and secured to the ground by inserting a spike and, optionally, a grid clip, screws, and a geogrid. The restraints can be cut to fit varying sized pathways, patios, driveways, and roads.

16 Claims, 15 Drawing Sheets

(56) References Cited

U.S. PATENT DOCUMENTS

| | | | |
|---|---|---|---|
| 2008/0104896 A1* | 5/2008 | Strobl | A01G 9/28 52/101 |
| 2010/0186293 A1* | 7/2010 | Flynn | A01G 9/28 47/33 |
| 2010/0293871 A1 | 11/2010 | Strobl et al. | |

* cited by examiner

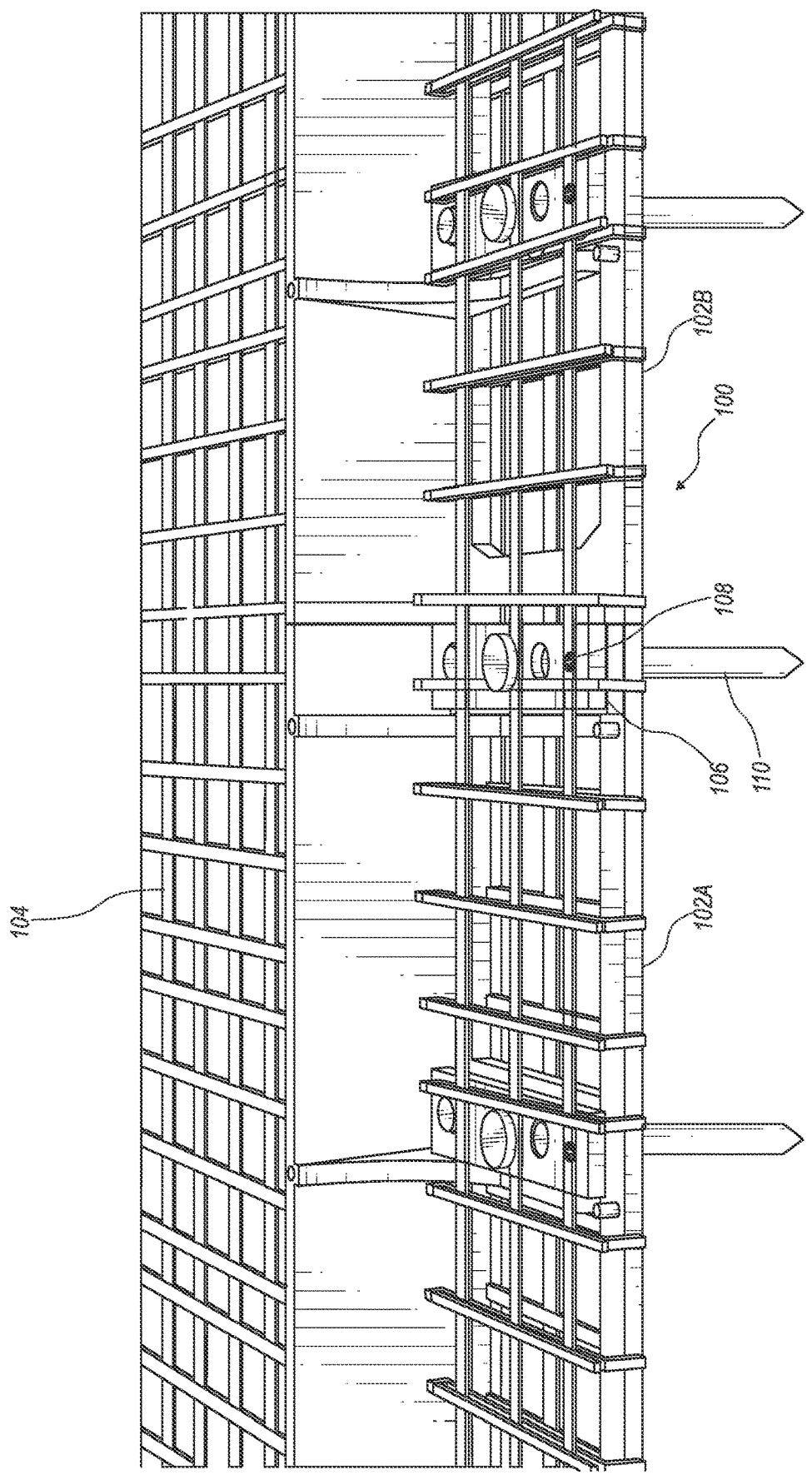

EDGE RESTRAINT SYSTEM FOR PAVERS

CROSS-REFERENCE TO RELATED APPLICATIONS

This application claims the benefit of U.S. Provisional Application Ser. 63/368,944, filed on Jul. 20, 2022, which is incorporated herein by reference.

TECHNICAL FIELD

The present disclosure relates to edge restraint systems. More particularly, the present disclosure relates to a modular, interlocking edge restraint system for aligning pavers with improved resistance to movement and pull-out resistance.

BACKGROUND

Paving systems provide walkways for foot traffic and driveways and roads for vehicular traffic that are an essential part of most landscaping projects and new housing developments. Pavers maintain their interlocking form better than poured slabs of concrete because the individual blocks can adjust to accommodate the movement of underlying soil, thus preventing unseemly cracks and other disturbances to the structural integrity and aesthetics of a pathway or driveway. The resilience of paving systems is determined in part by the alignment of the edge restraints that encompass the pavers and the resistance to movement of those edge restraints. Resistance to movement and pull-out resistance, in turn, are determined in large part based on the physical properties and dimensions of the edge restraints and the means of fastening the system to both the geogrid and the ground beneath it. The greater the resistance to movement and pull-out resistance, the more resilient the paving system is to being displaced by soil movement.

Edge restraints in the prior art, however, are difficult to install due to the lack of modularity and flexibility in spacing edge restraints at appropriate intervals. Moreover, current edge restraint systems lack proper resistance to movement and pull-out resistance, particularly in curved applications such as winding driveways where lateral forces exert more pressure on the paving system. Accordingly, there is a need for a modular, interlocking edge restraint system for aligning pavers that is easier to install and that has improved resistance to movement and greater pull-out resistance. The present disclosure solves these and other problems.

SUMMARY OF EXAMPLE EMBODIMENTS

In some embodiments, an edge restraint system for pavers comprises two or more interlocking edge restraints and a spike. The interlocking edge restraints comprise a vertical member, a horizontal member, a gusset configured to buttress the vertical member and the horizontal member at a right angle, a first engagement area, and a second engagement area opposite the first engagement area. The first engagement area comprises a first alignment button, a second alignment button, and a first spike aperture. The second engagement area comprises a first alignment button aperture, a second alignment button aperture, and a second spike aperture.

In some embodiments, an edge restraint system for pavers comprises two or more interlocking edge restraints, a geogrid, a grid clip, a screw, and a spike. The interlocking edge restraints comprise a vertical member, a horizontal member, a gusset configured to buttress the vertical member and the horizontal member at a right angle, a first engagement area, and a second engagement area opposite the first engagement area. The first engagement area comprises a first alignment button, a second alignment button, and a first spike aperture. The second engagement area comprises a first alignment button aperture, a second alignment button aperture, and a second spike aperture. The grid clip comprises a third alignment button aperture, a fourth alignment button aperture, a third spike aperture, and a screw aperture.

BRIEF DESCRIPTION OF THE DRAWINGS

FIG. 15 illustrates a top rear perspective view of an edge restraint system for pavers with spikes and screws.

DETAILED DESCRIPTION OF EXAMPLE EMBODIMENTS

Figure 1:
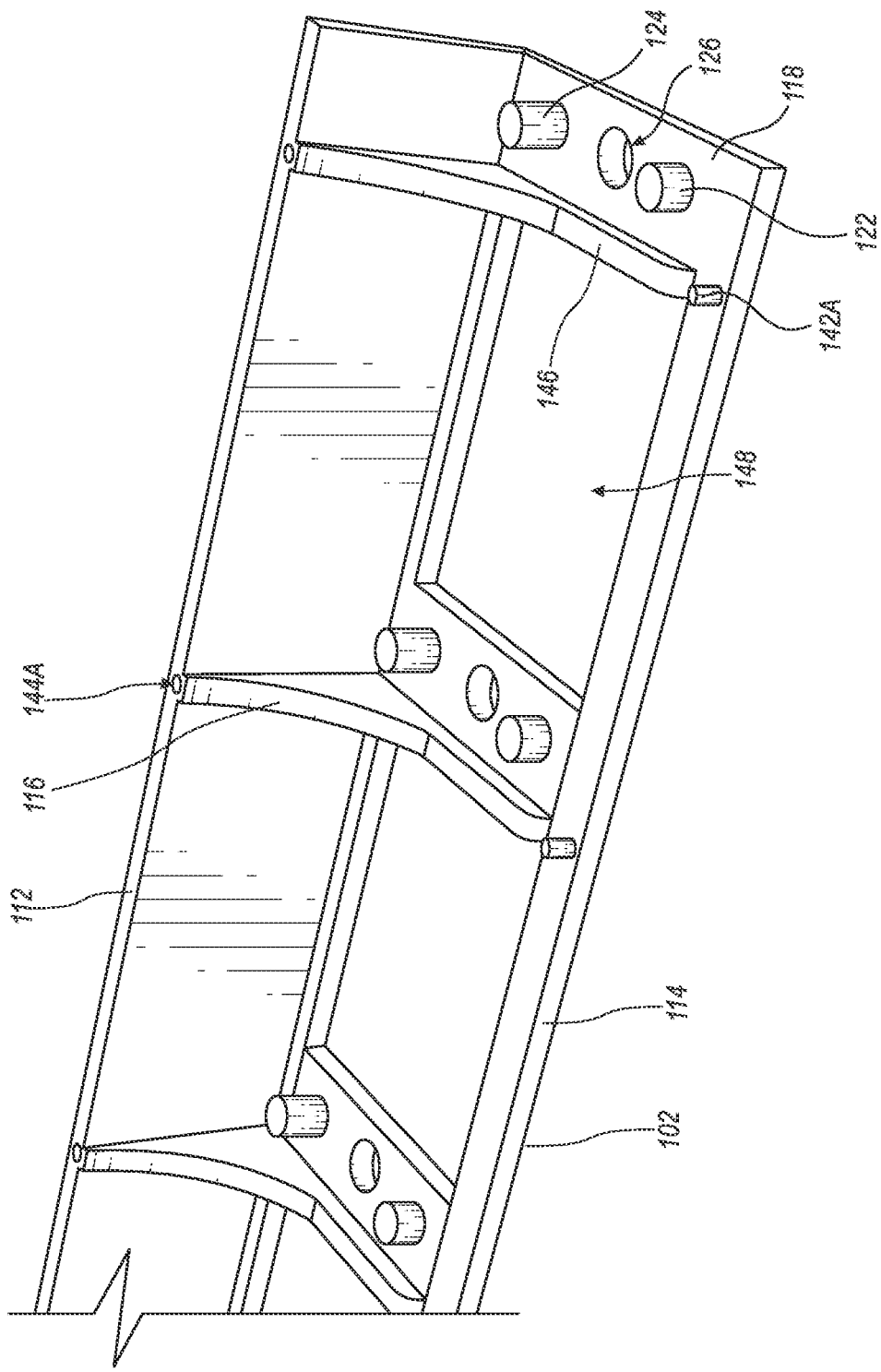
FIG. 1 illustrates a top rear perspective view of a first end of an interlocking edge restraint.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a modular, interlocking edge restraint system for aligning pavers that is easier to install and has greater pull-out resistance, particularly for use in curved applications. The present disclosure solves these problems and others.

Figure 2:
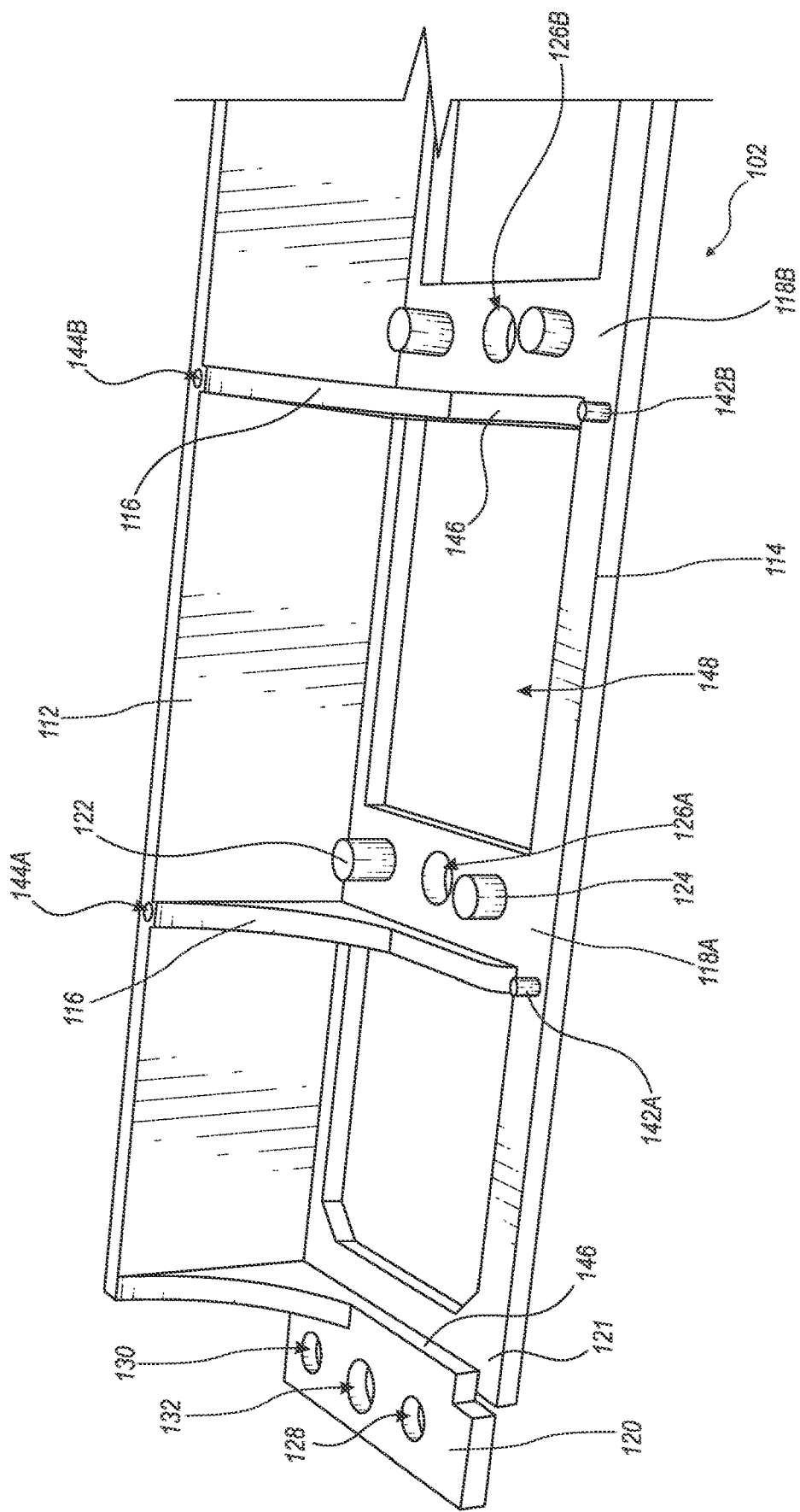
FIG. 2 illustrates a top rear perspective view of a second end of an interlocking edge restraint with multiple first engagement areas.
Figure 7:
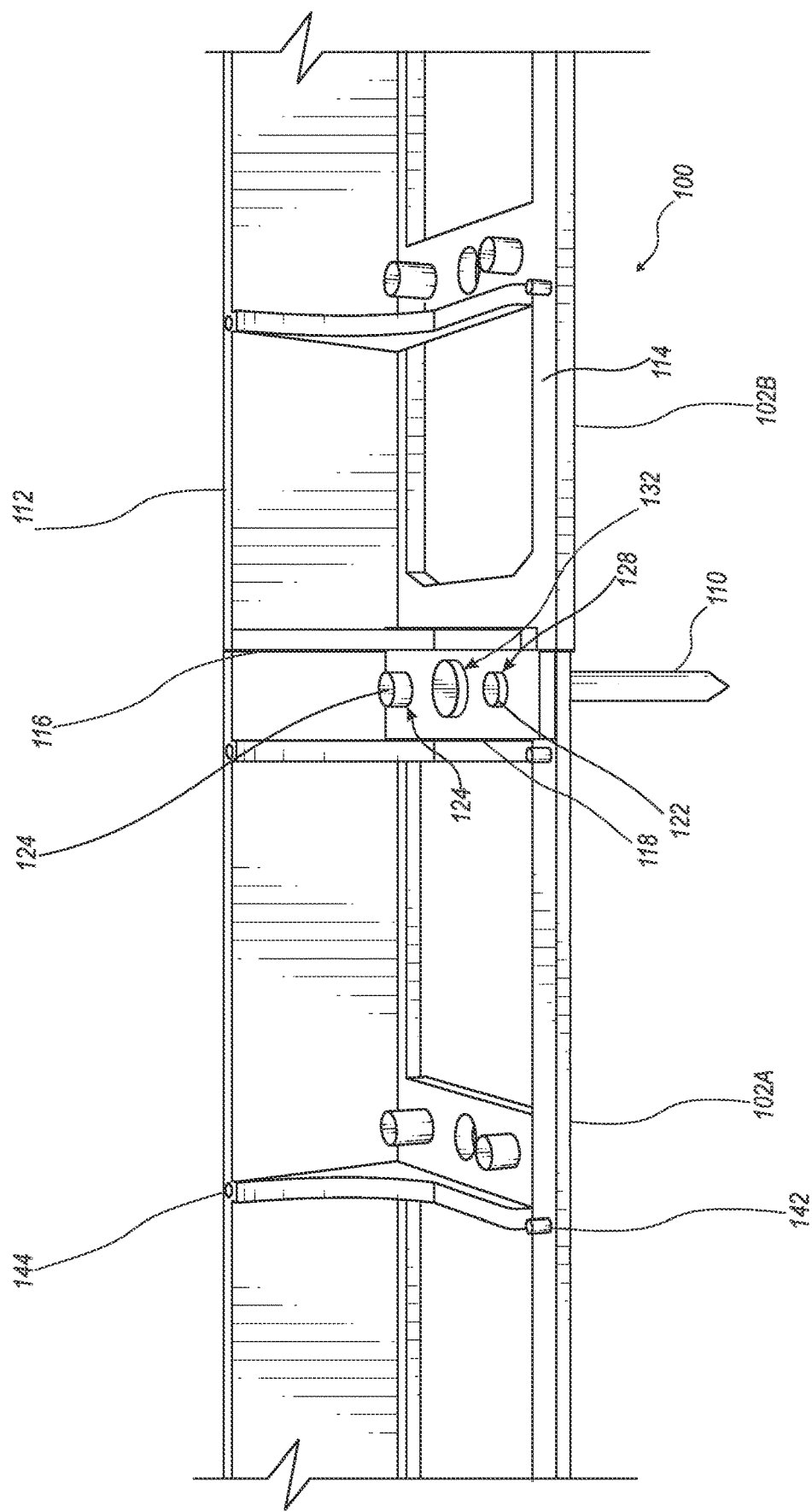
FIG. 7 illustrates a top rear perspective view of a first interlocking edge restraint coupled to a second interlocking edge restraint with a spike.
Figure 8:
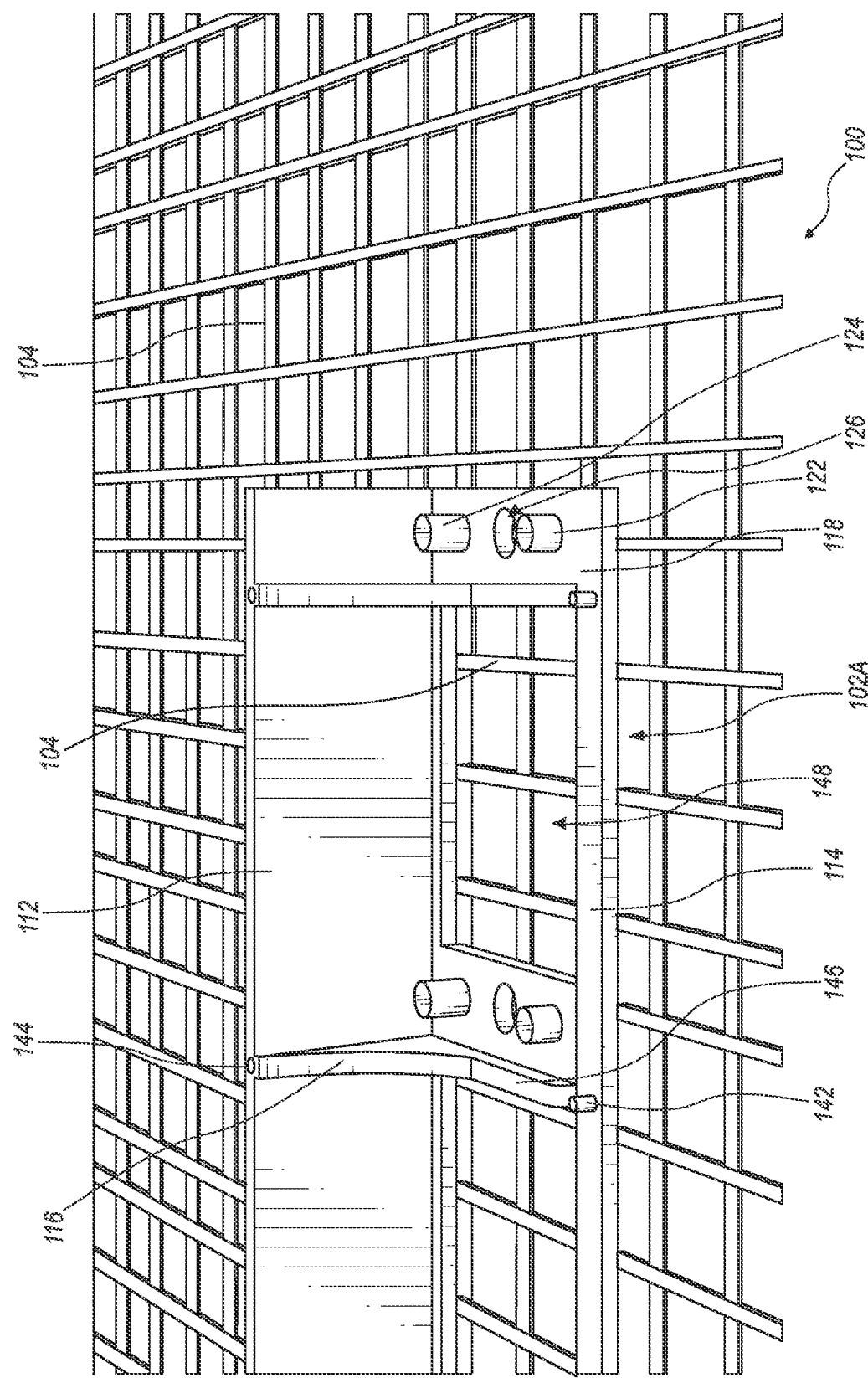
FIG. 8 illustrates a top rear perspective view of an interlocking edge restraint on a geogrid.
Figure 9:
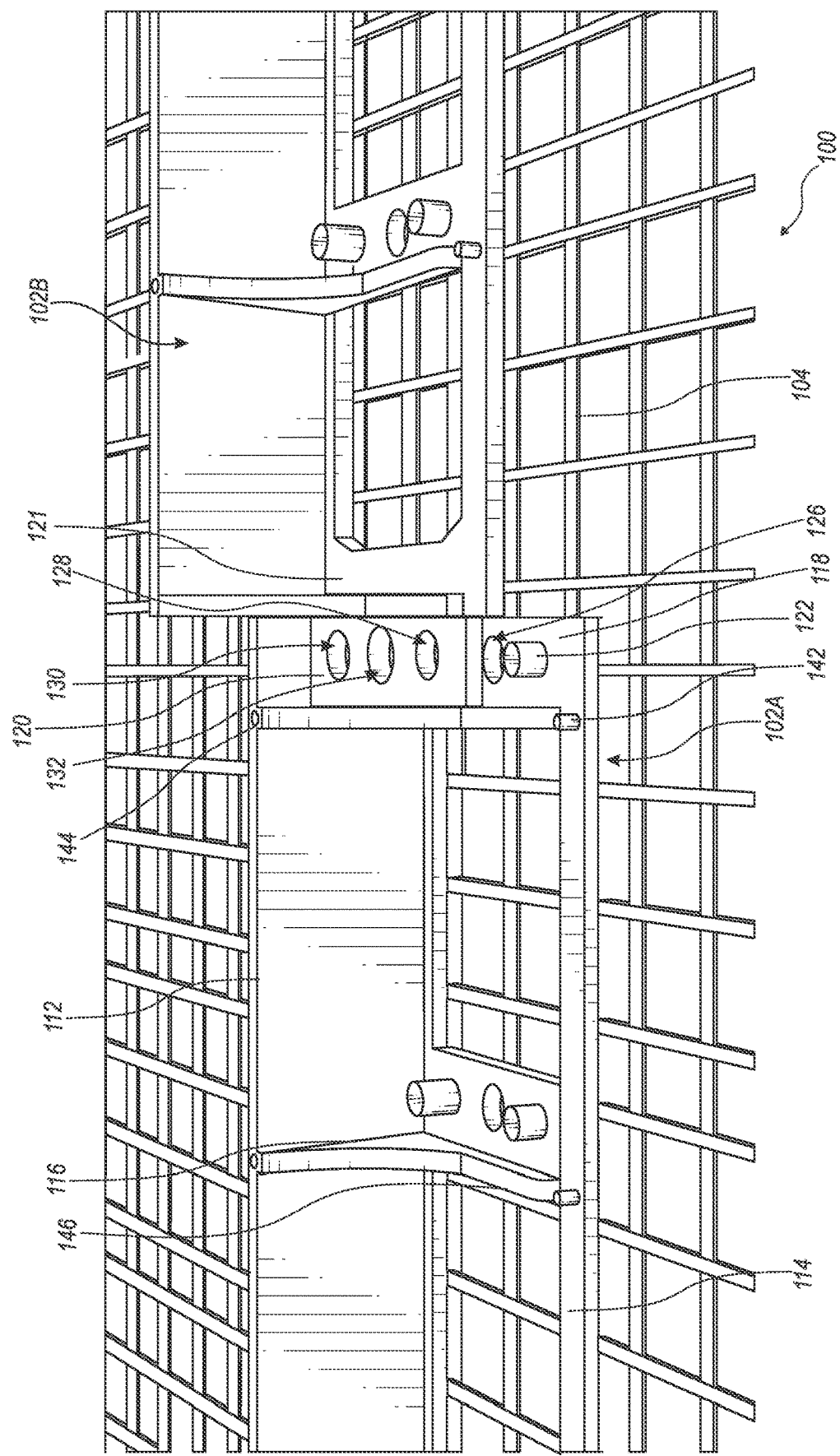
FIG. 9 illustrates a top rear perspective view of a first end of a first interlocking edge restraint aligned with a second end of a second interlocking edge restraint on a geogrid.
Figure 10:
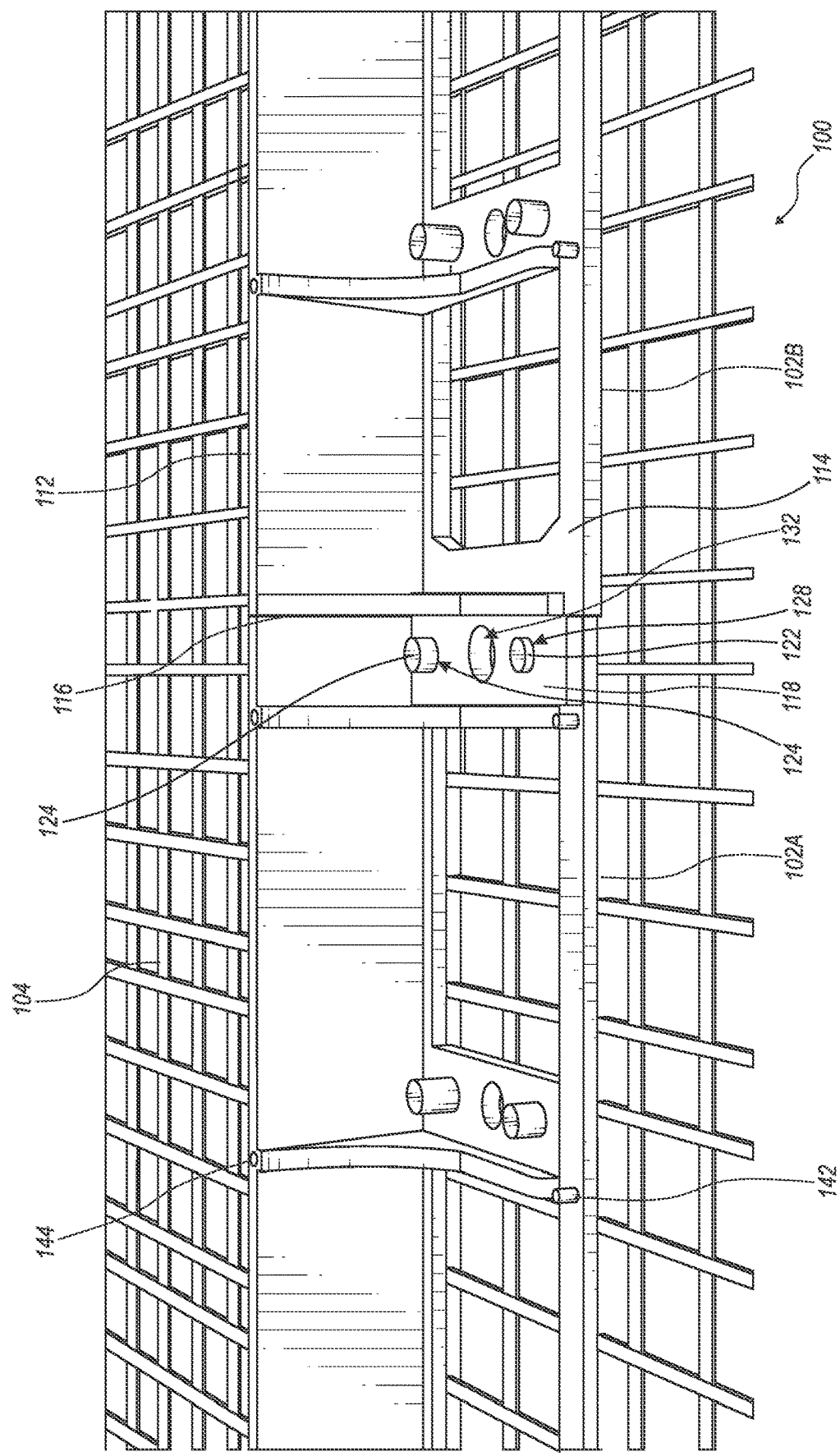
FIG. 10 illustrates a top rear perspective view of a first interlocking edge restraint coupled to a second interlocking edge restraint on a geogrid.

In some embodiments, as shown in FIGS. 1-7, an edge restraint system for pavers 100 comprises two or more interlocking edge restraints 102A, 102B and a spike 110 (FIG. 7). The interlocking edge restraints 102A, 102B each comprise a vertical member 112, a horizontal member 114, at least one gusset 116 configured to buttress the vertical member 112 and the horizontal member 114 at a right angle, a first engagement area 118 on a first end, and a second engagement area 120 on a second end of the horizontal member 114 opposite the first engagement area 118. As best seen in FIG. 1, the first engagement area 118 comprises a first alignment button 122, a second alignment button 124, and a first spike aperture 126. As best seen in FIG. 2, the second engagement area 120 comprises a first alignment button aperture 128, a second alignment button aperture 130, and a second spike aperture 132.

Figure 3:
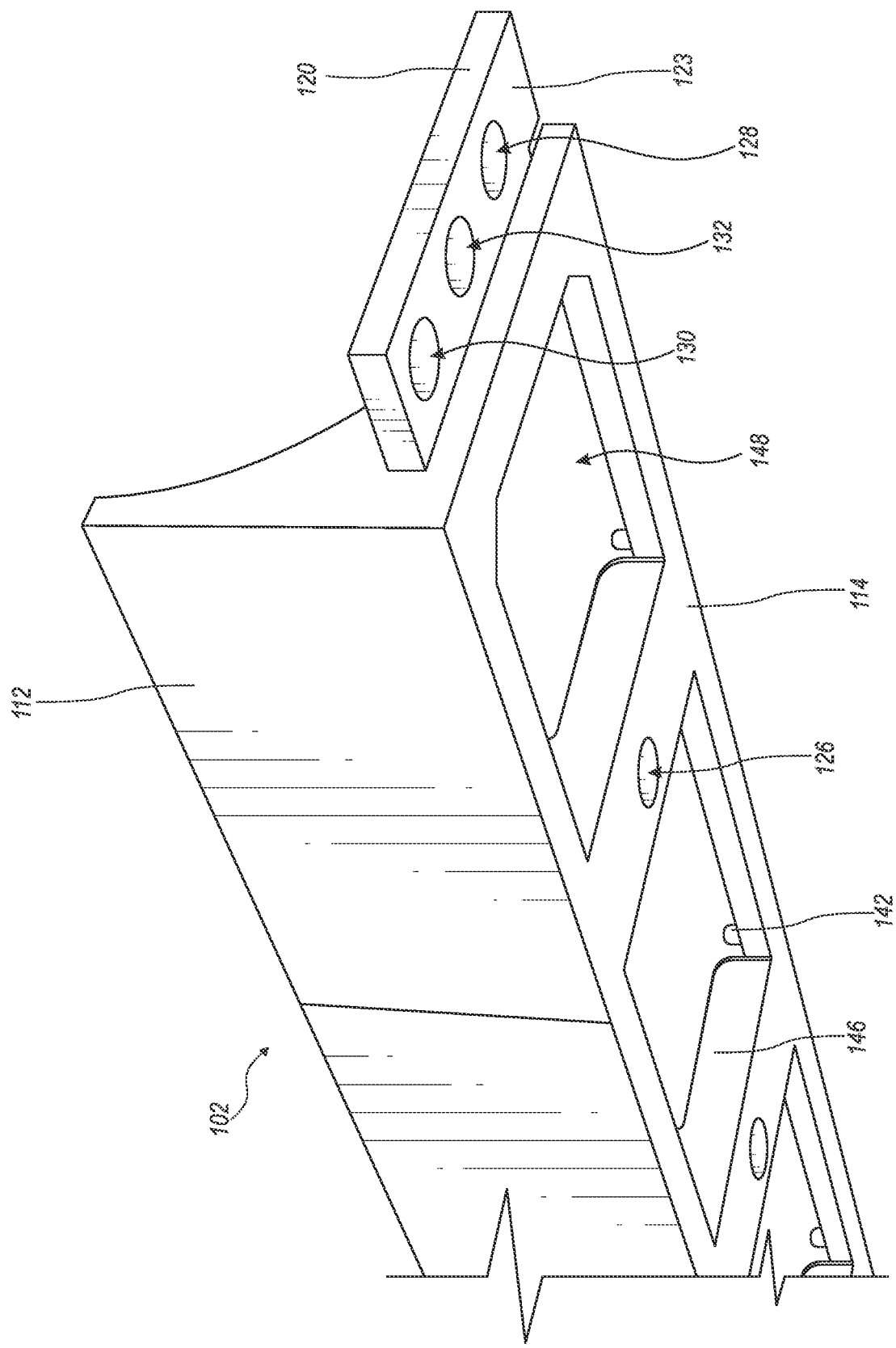
FIG. 3 illustrates a bottom front perspective view of a second end of an interlocking edge restraint.
Figure 4:
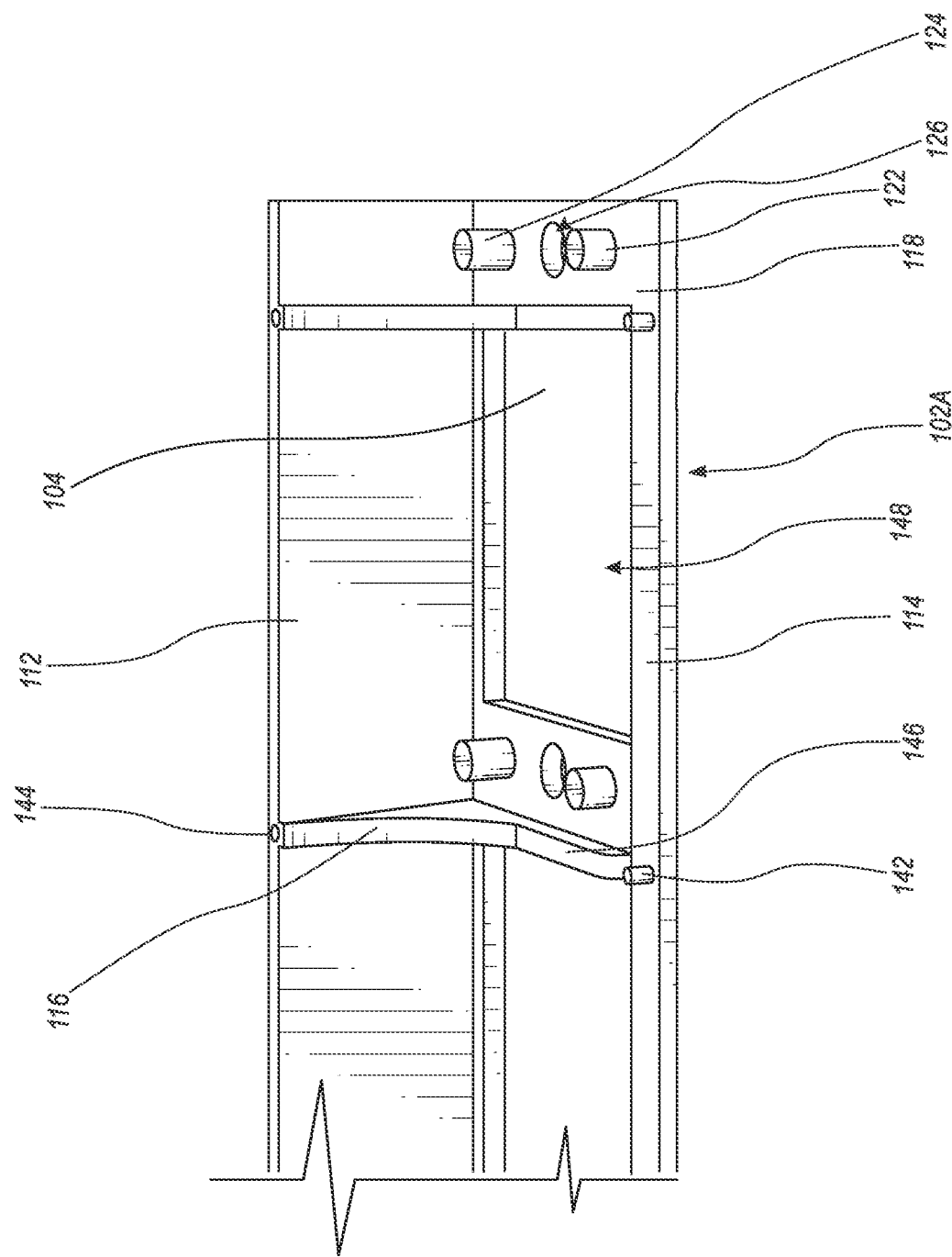
FIG. 4 illustrates a top rear perspective view of a first end of a first interlocking edge restraint.
Figure 5:
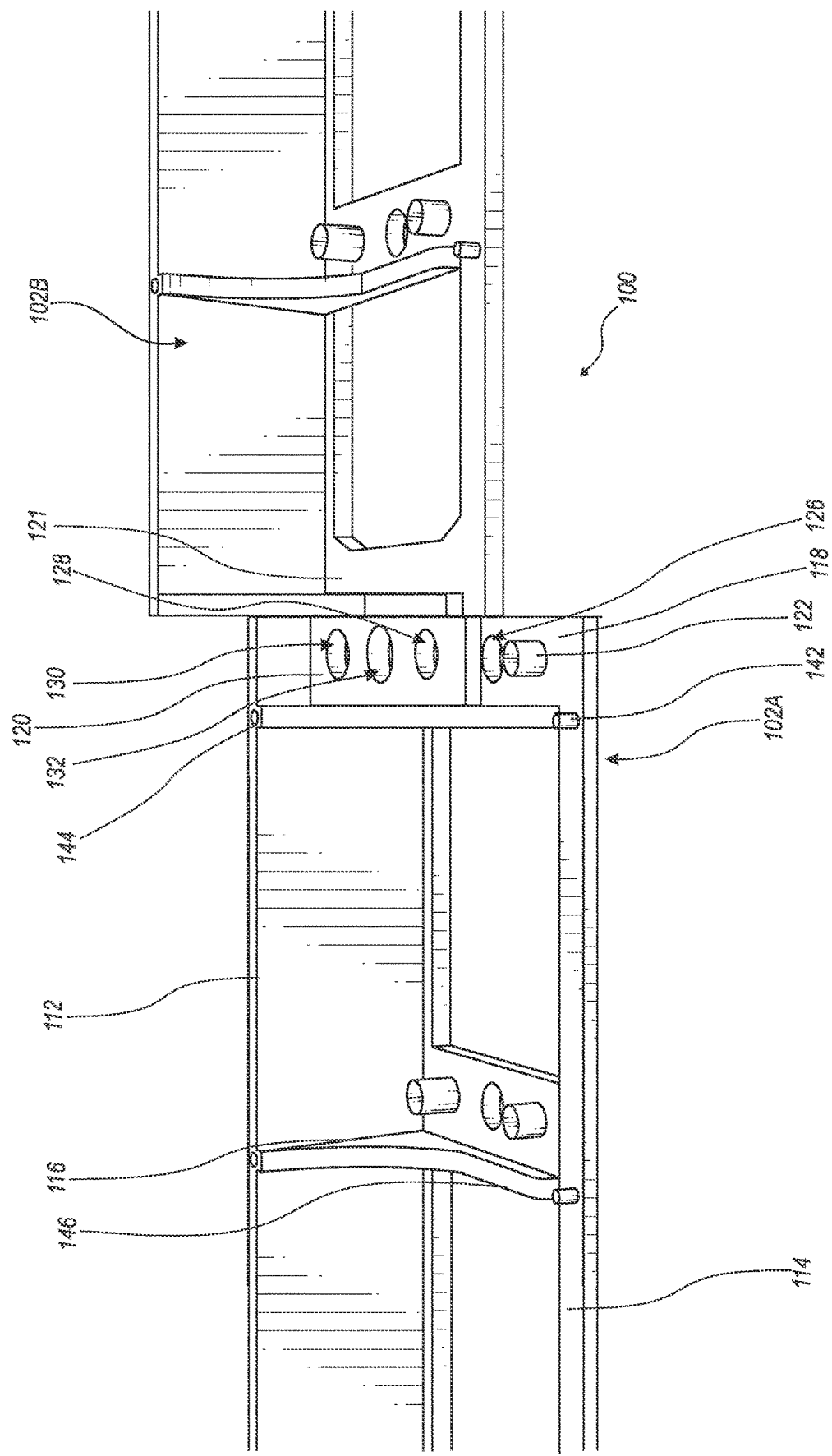
FIG. 5 illustrates a top rear perspective view of a first end of a first interlocking edge restraint aligned with a second end of a second interlocking edge restraint.
Figure 6:
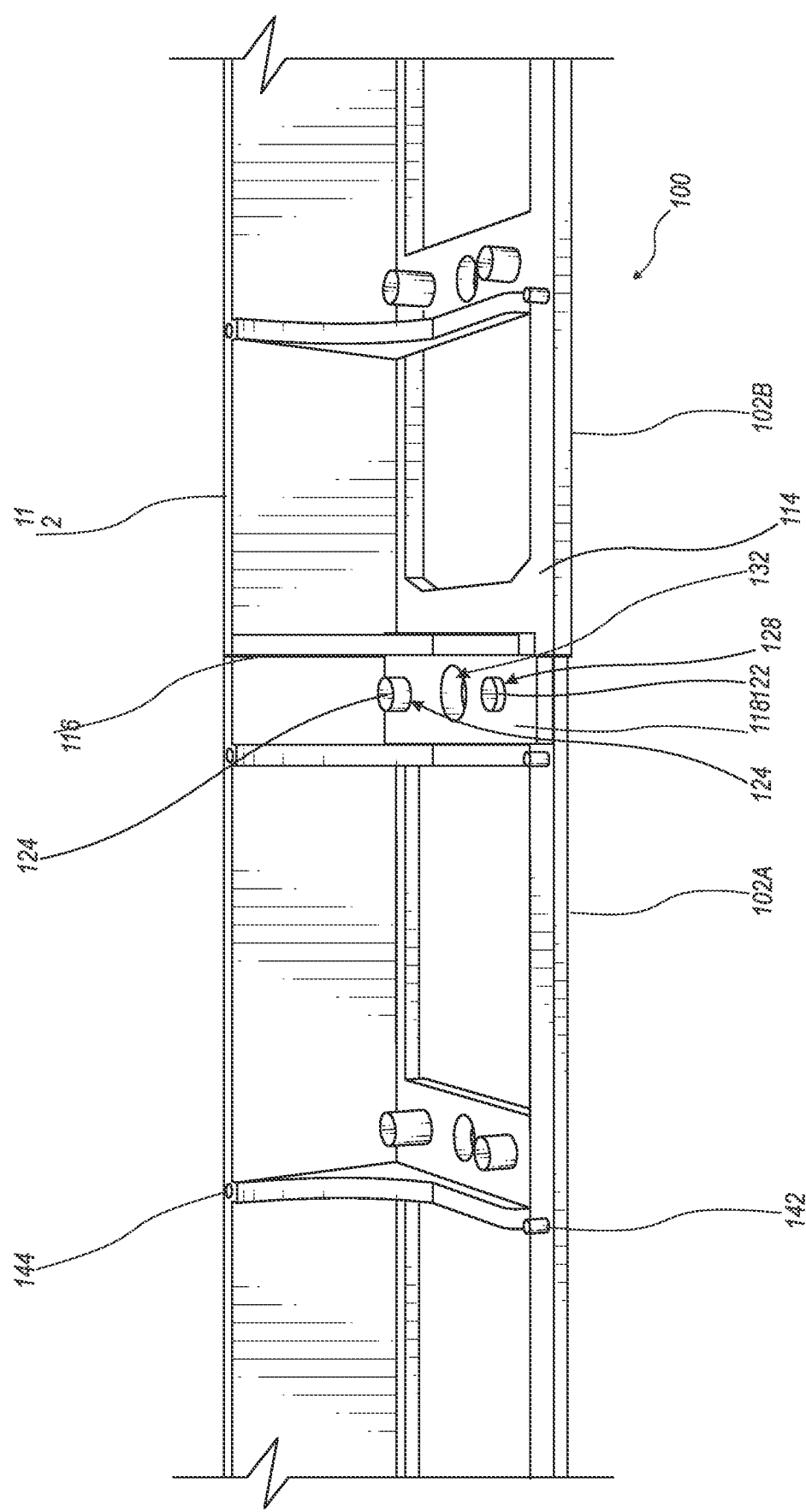
FIG. 6 illustrates a top rear perspective view of a first interlocking edge restraint coupled to a second interlocking edge restraint.

The second engagement area 120 is elevated above a first surface 121 of the horizontal member 114. In other words, and as best seen in FIG. 3, the bottom side 123 of the second engagement area 120 extends from the first surface 121 (FIG. 2) of the horizontal member 114. The second engagement area 120 extends longitudinally from the horizontal member 114 to permit it to overlap with the first engagement area 118 of the first interlocking edge restraint 102A. For example, as understood with regard to FIGS. 5-6, the first alignment button 122 on the first engagement area 118 of the first interlocking edge restraint 102A is couplable to the first alignment button aperture 128 (i.e., button 122 is received within aperture 128) on the second engagement area 120 on the second interlocking edge restraint 102B. Likewise, the second alignment button 124 on the first engagement area 118 of the first interlocking edge restraint 102A is couplable to (i.e., received within) the second alignment button aperture 130 on the second engagement area 120 on the second interlocking edge restraint 102B. Referring to FIG. 7, once coupled, a spike 110 may be driven through the respective spike apertures 132 (126 not visible in this view) to stake the edge restraint system for pavers 100 to the ground. It will be appreciated that the horizontal member 114 may comprise a plurality of spike apertures 126, allowing a plurality of spikes 110 to be used to better secure the edge restraint system for pavers 100 to the ground.

In some embodiments, as shown in FIGS. 8-15, an edge restraint system for pavers 100 comprises two or more interlocking edge restraints 102A, 102B, a geogrid 104, a grid clip 106, a screw 108, and a spike 110. The interlocking edge restraints 102 each comprise a vertical member 112, a horizontal member 114, a gusset 116 configured to buttress the vertical member 112 and the horizontal member 114 at a right angle, a first engagement area 118 on a first end, and a second engagement area 120 on the opposite, second end of the first engagement area 118. The first engagement area 118 comprises a first alignment button 122, a second alignment button 124, and a first spike aperture 126. In some embodiments, the first alignment button 122 comprises a first height and the second alignment button 124 comprises a second height that is greater than the first height, although not required. The heights may be the same or even reversed.

The second engagement area 120 comprises a first alignment button aperture 128, a second alignment button aperture 130, and a second spike aperture 132. The bottom of the second engagement area 120 is elevated above a first surface 121 of the horizontal member 114 and extends longitudinally from the first surface of the horizontal member 114 to permit overlap with the first engagement area 118 of the second interlocking edge restraint 102B. The grid clip 106 comprises a third alignment button aperture 134, a fourth alignment button aperture 136, a third spike aperture 138 interposed between the third alignment button aperture 134 and the fourth alignment button aperture 136, and a screw aperture 140. It will be appreciated that fastening the geogrid 104 to the interlocking edge restraints 102A-B harnesses the weight and friction of the pavers to develop greater pull-out resistance, thus resisting lateral movement of the edge restraint system 100. Moreover, the interaction of the geogrid 104 with the soil, rock, gravel, and/or sand also develops increased pull-out resistance.

Figure 11:
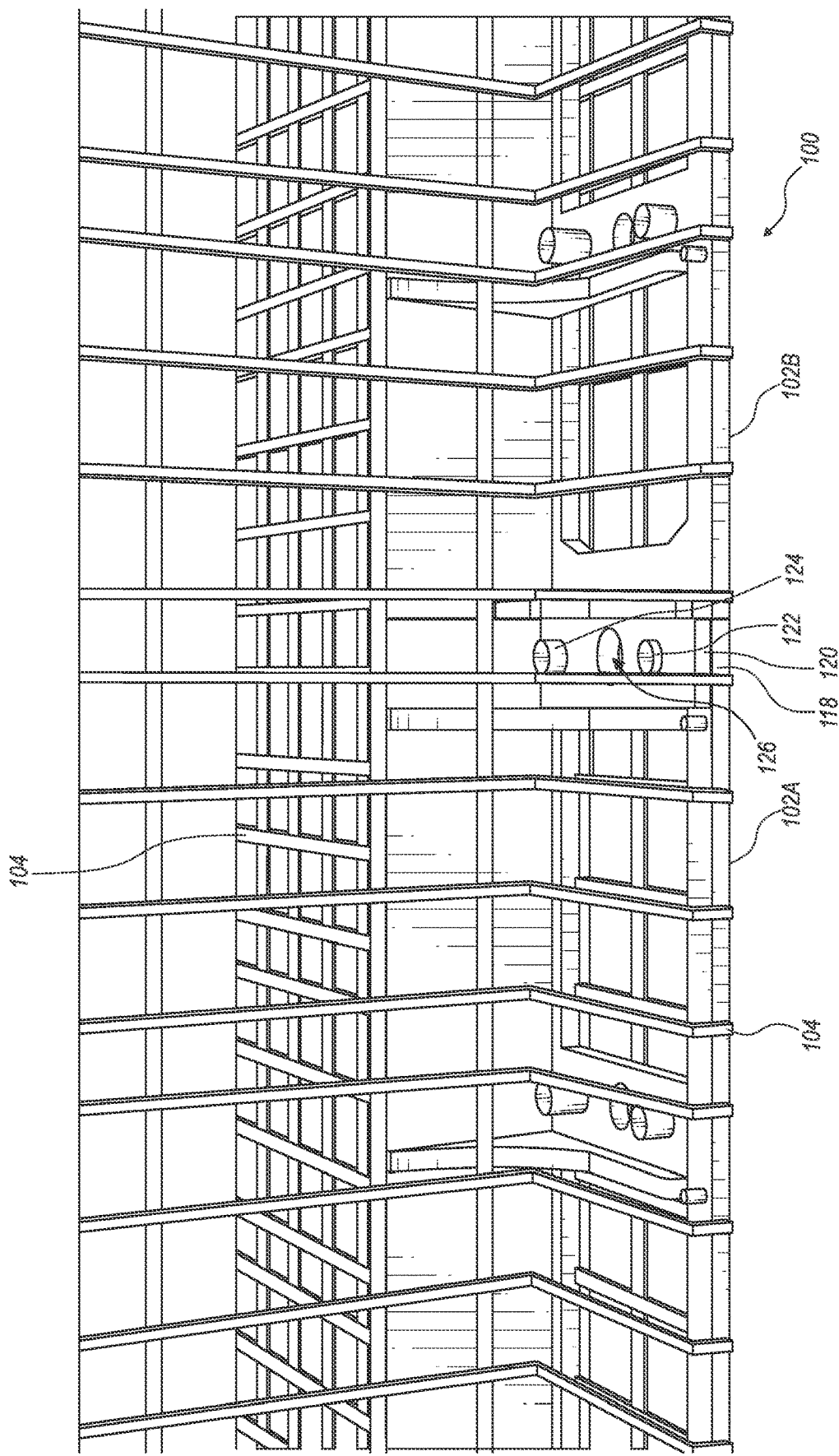
FIG. 11 illustrates a top rear perspective view of a first interlocking edge restraint coupled to a second interlocking edge restraint with a geogrid folded over a horizontal member.
Figure 12:
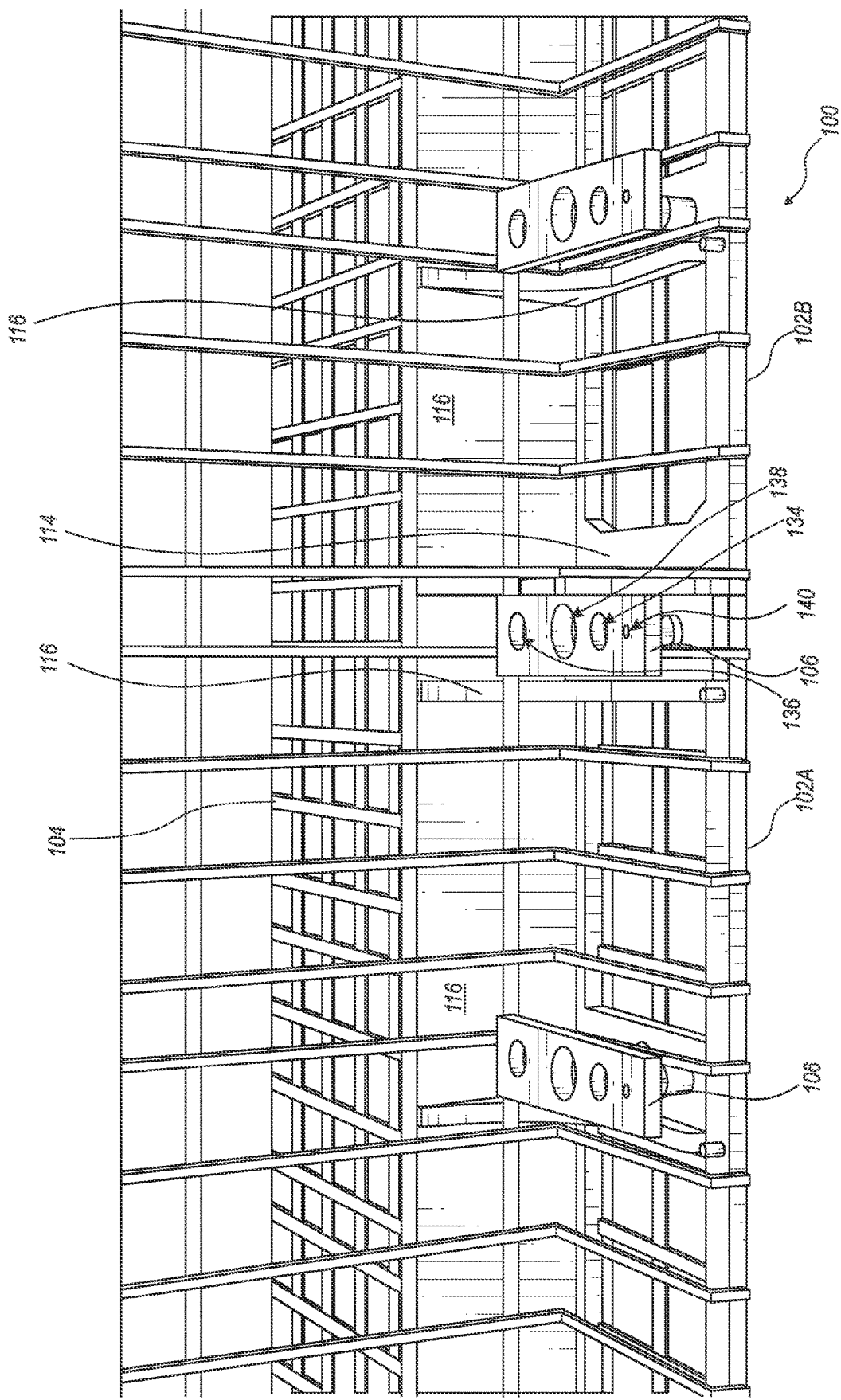
FIG. 12 illustrates a top rear perspective view of grid clips aligned with two interlocking edge restraints the geogrid interposed between the grid clips and the horizontal members.
Figure 13:
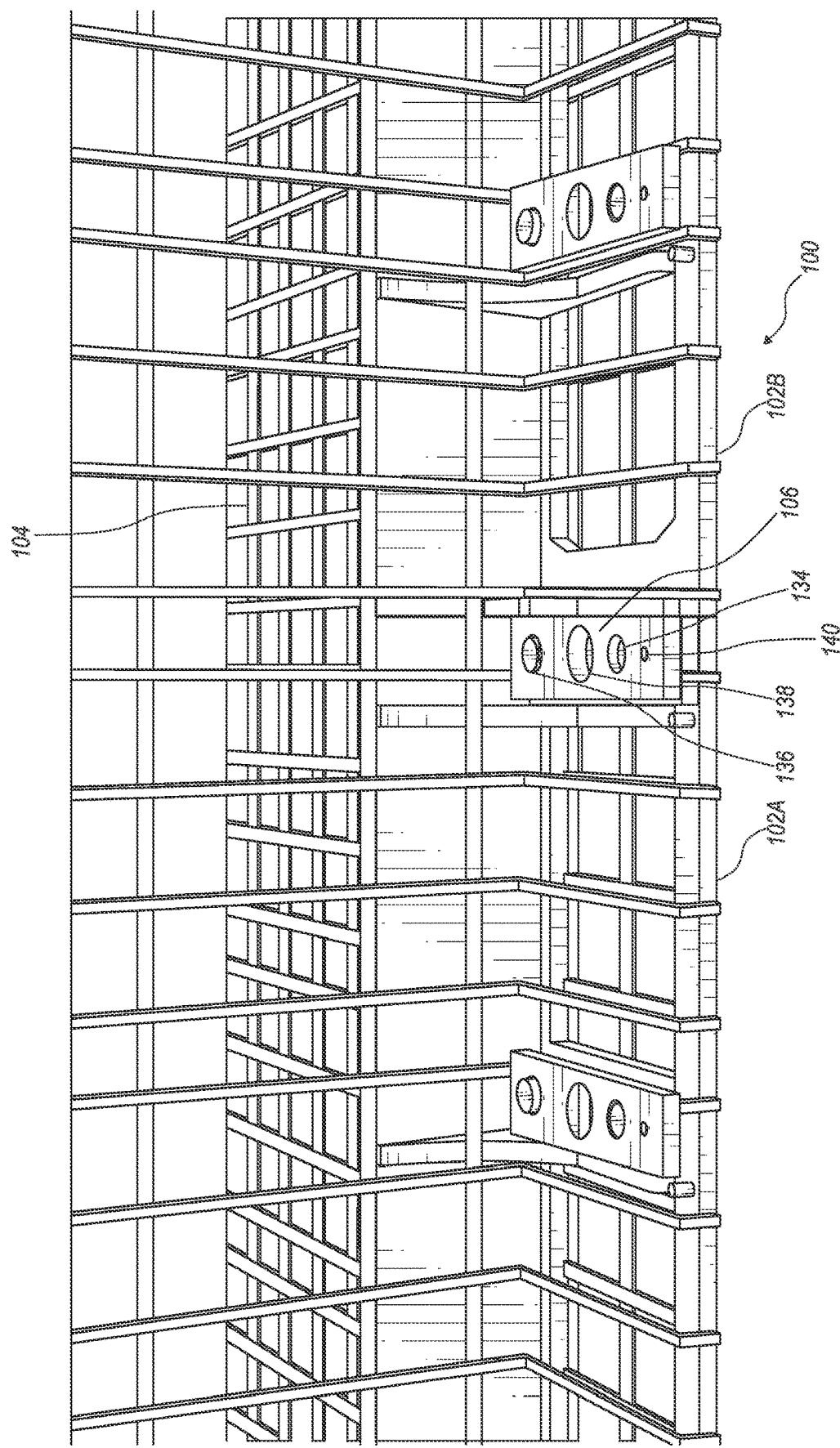
FIG. 13 illustrates a top rear perspective view of grid clips coupled to two interlocking edge restraints the geogrid interposed between the grid clips and the horizontal members.

For example, a user may couple the first engagement area 118 on the first interlocking edge restraint 102A with the second engagement area 120 on the second interlocking edge restraint 102B. This process may be repeated along a predetermined length of a perimeter of pavers until the perimeter is effectively circumscribed and supported by the edge restraint system 100. In some embodiments, the interlocking edge restraints 102A, 102B are seated on a geogrid 104. As shown in FIG. 11, after connecting the interlocking edge restraints 102A, 102B together, a portion of the geogrid 104 may be folded on top of the horizontal member 114 of the interlocking edge restraints 102A, 102B to further strengthen the integrity of the system as a whole. Referring to FIGS. 12-13, the grid clip 106 may then be coupled to the second engagement area 120 of the second interlocking edge restraint 102B to strengthen the coupling between the second interlocking edge interlocking edge restraint 102B and the first interlocking edge restraint 102A. In other words, the geogrid 104 is interposed between the grid clip 106 and the second engagement area 120. The grid clips 106 may also be coupled to the plurality of alignment buttons 122, 124 along the length of a given horizontal member 114, thereby securing the geogrid 104 to the horizontal member 114.

Figure 14:
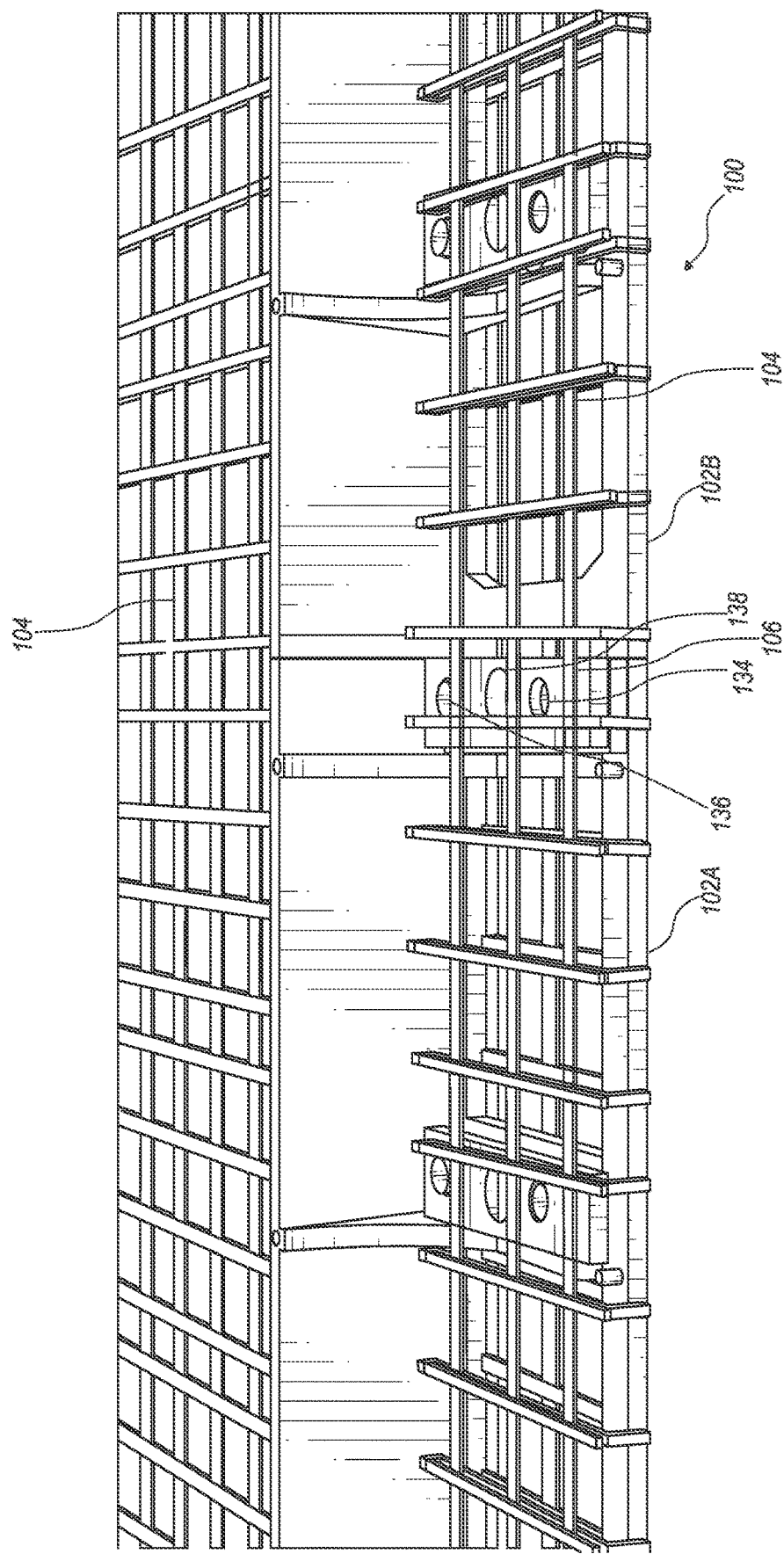
FIG. 14 illustrates a top rear perspective view of grid clips coupled to two interlocking edge restraints with a geogrid folded over the grip clips.

The geogrid 104 may then be folded and overlaid again on top of the grid clip 106, as shown in FIGS. 14-15, creating a second layering. Next, the spike 110 may be driven directly through the alignment of the third, second, and first spike apertures 138, 132, 126, respectively, and into the ground beneath, thus securing the edge restraint system 100 in place in relation to the ground. The spikes may be placed along the length of the edge restraint system 100 at varied intervals and distances according to the application via the plurality of first spike apertures 126 along the length of the horizontal member. Lastly, a screw 108 (FIG. 15) may also be inserted within the screw aperture 140 of the grid clip 106 and screwed into the second engagement area 120 of the second interlocking edge restraint 102B and the first engagement area 118 of the first interlocking edge restraint 102A. Upon assembly, the edge restraint system 100 may be covered in granular soil material to both conceal the edge restraint system 100 and increase the shear strength of overlying granular fill collected within the geogrid 104. As a result of the first and second interlocking edge restraints 102A-B interlocking and being secured to the geogrid 104 and the earth beneath, the edge restraint system disclosed herein solves the need for a modular, interlocking edge restraint system for aligning pavers that is easier to install and has greater resistance to movement and pull-out resistance, particularly for use in curved application.

As best seen in FIG. 2, an interlocking edge restraint 102 may comprise more than one first engagement area 118A, 118B. This provides two features: first, it allows a user to trim the length of the interlocking edge restraint 102 to fit a particular application while still allowing the interlocking of a plurality of interlocking edge restraints 102 by using the available first engagement area 118A, 118B that is now on the edge where trimmed. The second feature is that the first engagement area 118A, 118B facilitates the placement of more spikes 110 through the first spike aperture 126A-B to ground the system. In such applications along a straight line, the system 100 may feature comparatively fewer couplings of first interlocking edge restraints 102A to second interlocking edge restraints 102B, permitting longer interlocking edge restraints 102 spaced apart at longer intervals between couplings. Where the interlocking edge restraints 102 comprise more than one first engagement area 118, each spike 110 may be driven directly through the first spike aperture 126A-B into the ground without being driven through the second spike aperture 132 on the second engagement area 120 or the third spike aperture on the grid clip 104. However, in some embodiments, the grid clip 106 may be used in conjunction with each first engagement area 118A-B, thereby better securing the geogrid 104.

It will be appreciated that in certain paver applications, such as permeable pavers, where any excess water is syphoned into a collection system rather than permitted to run off into a pond or onto an adjacent property, traditional spikes do not work effectively in conjunction with the permeable material that the pavers are placed upon. Thus, use of the interlocking edge restraints 102 with the geogrid 104 better holds the edge restraint system 100 in place, overcoming limitations in the prior art. Similarly, there are places in a normal paver application, such as on a curve in a driveway, that tend to have additional lateral pressures applied to them, where the geogrid 104 provides additional resistance against the lateral forces, in combination with the increased pull-out resistance provided by the spikes 110, thereby overcoming limitations in the prior art.

In some embodiments, as best seen in FIGS. 1-3, the interlocking edge restraint 102 further comprises at least one stacking tab 142A-B and at least one stacking tab slot 144A-B. It will be appreciated that the stacking tab 142A-B on the first interlocking edge restraint 102A may be inverted and inserted into the stacking tab slot 144A-B on the second interlocking edge restraint 102B to couple the first and second interlocking edge restraints 102A, 102B together in a configuration resembling a rectangular prism. Such coupling minimizes the dimensions of the interlocking edge restraints 102 and thus facilitates packaging and transportation of the interlocking edge restraints 102 in bulk quantities.

In some embodiments, as shown in FIGS. 1-15, the interlocking edge restraint 102 further comprises a gusset extension member 146 that extends from the gusset 116 along the horizontal member 114, thereby reinforcing the horizontal member 114. As best seen in FIG. 2, the gusset extension member 146 may be integrated with the second engagement area 120 of the interlocking edge restraint 102. It will be appreciated that such integration reinforces the vertical member 112 such that no additional means of connection is necessary between the vertical members 112 when coupling the first interlocking edge restraint 102A with the second interlocking edge restraint 102B.

In some embodiments, as shown in FIGS. 1-15, the interlocking edge restraint 102 comprises one or more lightening apertures 148 on the horizontal member 114. It will be appreciated that the lightening apertures 148 may be cut out or so designed during the manufacturing process to reduce the overall quantity of material used in the production of the system 100. The lightening apertures 148 minimize the weight of the individual components and reduce the overall cost of materials needed to produce the edge restraint system for pavers 100.

In some embodiments, the vertical member 112 of the interlocking edge restraint 102 may be either convex or concave in order to better reinforce the particular form and shape of the pavers. For example, some pavers have rounded edges, and in such applications the vertical member 112 of the interlocking edge restraint 102 may be concave to better form to the paver block and maximize the surface area in contact between the paver block and the vertical member 112. The better the fit between the pavers and the vertical member 112, the more resilient the pavers will be to displacement.

In some methods of use, a user places the geogrid 104 on a surface to be paved, places the vertical member 112 of the first interlocking edge restraint 102A in contact with a paver, places the horizontal member 114 of the first interlocking edge restraint 102A in contact with the geogrid 104 (if being used), couples the second interlocking edge restraint 102B to the first interlocking edge restraint 102A through placement of the second engagement area 120 on the second interlocking edge restraint 102B in alignment with the first engagement area 118 of the first interlocking edge restraint 102A such that the first alignment button aperture 128 and the second alignment button aperture 130 on the second interlocking edge restraint 102B align with the complementary first alignment button 122 and the second alignment button 124 respectively on the first interlocking edge restraint 102A. The user then overlays the geogrid 104 over the first and second interlocking edge restraints 102A, 102B, couples the grid clip 106 to the second alignment button 124 from the first interlocking edge restraint 102A, folds the geogrid 104 over the grip clip 106, and drives the spike 110 through the second spike aperture 132 of the second interlocking edge restraint 102B, through the first spike aperture 126 of the first interlocking edge restraint 102A, and into the surface to be paved. Lastly, a user couples the screw 108 to the screw aperture 140 to further secure the first and second interlocking edge restraints 102A, 102B together with the grid clip 106.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An edge restraint system for pavers, comprising:
two or more interlocking edge restraints and a spike;
wherein each interlocking edge restraint comprises:
a vertical member,
a horizontal member,
a gusset that is configured to buttress the vertical and horizontal members at a right angle,
a first engagement area on a first end, and
a second engagement area on a second end opposite the first engagement area, wherein the first engagement area comprises a first alignment button extending vertically from the horizontal member, a second alignment button extending vertically from the horizontal member, and a first spike aperture interposed between the first alignment button and the second alignment button, and the second engagement area comprising a first alignment button aperture on the horizontal member, a second alignment button aperture on the horizontal member, and a second spike aperture interposed between the first and second alignment button apertures.

2. The edge restraint system for pavers of claim 1, wherein the interlocking edge restraints further comprise a stacking tab and a stacking tab slot.

3. The edge restraint system for pavers of claim 1, wherein the interlocking edge restraints further comprise a gusset extension member that extends from the gusset along the horizonal member and perpendicular to the vertical member.

4. The edge restraint system for pavers of claim 1, wherein the horizontal member of the interlocking edge restraints further comprises one or more lightening apertures.

5. The edge restraint system for pavers of claim 1, wherein the first alignment button comprises a first height and the second alignment button comprises a second height that is greater than the first height.

6. The edge restraint system for pavers of claim 1, wherein the interlocking edge restraints comprise two or more first engagement areas.

7. The edge restraint system for pavers of claim 1, further comprising a grid clip and a geogrid.

8. An edge restraint system for pavers, comprising:
a first interlocking edge restraint and a second interlocking edge restraint, each interlocking edge restraint comprising:
a vertical member,
a horizontal member,
a gusset that is configured to buttress the vertical and horizontal members at a right angle,
a first engagement area on a first end, and
a second engagement area on a second end opposite the first engagement area,
wherein the first engagement area comprises a first alignment button extending vertically from the horizontal member, a second alignment button extending vertically from the horizontal member, and a first spike aperture interposed between the first alignment button and the second alignment button, and the second engagement area comprises a first alignment button aperture on the horizontal member, a second alignment button aperture on the horizontal member, and a second spike aperture interposed between the first and second alignment button apertures;
a geogrid;
a grid clip, comprising:
a third alignment button aperture configured to align with the first alignment button aperture, a fourth alignment button aperture configured to align with the second alignment button aperture, a third spike aperture interposed between the third and fourth alignment button apertures, and a screw aperture;
a spike; and
a screw;
wherein the second engagement area of the second interlocking edge restraint is configured to overlay the first engagement area of the first interlocking edge restraint, and the grid clip is configured to overlay the second engagement area, the spike and screw configured to pass through the grid clip, second interlocking edge restraint, and the first interlocking edge restraint.

9. The edge restraint system for pavers of claim 8, wherein the first and second interlocking edge restraints each further comprise a stacking tab and a stacking tab slot.

10. The edge restraint system for pavers of claim 8, wherein the first and second interlocking edge restraints further comprise a gusset extension member that extends from the gusset along the horizonal member.

11. The edge restraint system for pavers of claim 8, wherein the horizontal member of the interlocking edge restraints further comprises one or more lightening apertures.

12. The edge restraint system for pavers of claim 8, wherein the first alignment button comprises a first height and the second alignment button comprises a second height that is greater than the first height.

13. The edge restraint system for pavers of claim 8, wherein each interlocking edge restraint comprises two or more first engagement areas.

14. A method of using an edge restraint system for pavers, the method comprising:
coupling a first interlocking edge restraint to a second interlocking edge restraint, the first and second interlocking edge restraints each comprising:
a vertical member, a horizontal member, a gusset that is configured to buttress the vertical and horizontal members, at least one first engagement area, and one second engagement area, wherein the first engagement area comprises a first alignment button extending vertically from the horizontal member, a second alignment button extending vertically from the horizontal member, and a first spike aperture interposed between the first alignment button and the second alignment button, and the second engagement area comprises a first alignment button aperture on the horizontal member, a second alignment button aperture on the horizontal member, and a second spike aperture interposed between the first and second alignment button apertures;
placing the vertical members of the first and second interlocking edge restraints in contact with a paver; and
wherein the first and second interlocking edge restraints are coupled together by inserting the first alignment button of the first interlocking edge restraint into the first alignment button aperture of the second interlocking edge restraint, and simultaneously inserting the second alignment button of the first interlocking edge restraint into the second alignment button aperture of the second interlocking edge restraint.

15. The method of claim 14, further comprising:
after coupling the first engagement area of the first interlocking edge restraint with the second engagement area of the second interlocking edge restraint, coupling a grid clip to the second engagement area of the second interlocking edge restraint, wherein the grid clip comprises a third alignment button aperture, a fourth alignment button aperture, a third spike aperture, and a screw aperture;
driving a screw into the screw aperture of the grid clip and into the second engagement area of the second interlocking edge restraint and into the first engagement area of the first interlocking edge restraint; and
driving a spike through the third spike aperture, the second spike aperture, and the first spike aperture, respectively, and into the surface to be paved.

16. The method of claim 15, further comprising:
initially positioning a geogrid on a surface to be paved;
positioning the first and second interlocking edge restraints in contact with the geogrid;
prior to coupling the grid clip to the second engagement area of the second interlocking edge restraint, folding the geogrid over the second engagement area; and
prior to driving the spike, folding the geogrid back over the grid clip.

* * * * *